United States Patent
Reber et al.

(10) Patent No.: US 6,180,003 B1
(45) Date of Patent: Jan. 30, 2001

(54) PORTABLE APPARATUS FOR STORING AND DISINFECTING A FLUID USING ULTRAVIOLET SOURCE

(75) Inventors: William L Reber, Schaumburg, IL (US); Cary D. Perttunen, Shelby Township, MI (US); Michael K. Stenstrom, Los Angeles, CA (US)

(73) Assignee: Motorola, Inc., Schaumburg, IL (US)

( * ) Notice: Under 35 U.S.C. 154(b), the term of this patent shall be extended for 0 days.

(21) Appl. No.: 09/448,014

(22) Filed: Nov. 23, 1999

Related U.S. Application Data (63) Continuation of application No. 08/770,754, filed on Dec. 19, 1996, now Pat. No. 6,042,720.

(51) Int. Cl.7 ......................................... C02F 1/32
(52) U.S. Cl. .................. 210/198.1; 210/748; 422/24; 340/600; 250/461.1; 250/504 R
(58) Field of Search ............................. 210/85, 243, 244, 210/416.3, 748, 198.1; 250/373, 372, 455.11, 496.1, 458.1, 461.1, 504 R; 422/22, 24; 340/540, 600

(56) References Cited

U.S. PATENT DOCUMENTS

| | | |
|---|---|---|
| 3,500,041 * | 3/1970 | Kassing . |
| 3,858,048 | 12/1974 | Shand et al. . |
| 3,971,947 * | 7/1976 | Lambert et al. . |
| 4,296,328 * | 10/1981 | Regan . |
| 4,448,750 * | 5/1984 | Fuesting . |
| 4,471,225 | 9/1984 | Hillman . |
| 4,755,292 * | 7/1988 | Merriam ............................ 210/192 |
| 4,762,613 * | 8/1988 | Snowball ........................... 210/192 |
| 4,868,397 * | 9/1989 | Tittel . |
| 4,992,644 * | 2/1991 | Webb . |
| 5,106,495 * | 4/1992 | Hughes ............................... 210/139 |
| 5,120,499 * | 6/1992 | Baron . |
| 5,389,254 | 2/1995 | Sherman . |
| 5,443,733 | 8/1995 | Mueller et al. . |
| 5,536,395 | 7/1996 | Kuennen et al. . |
| 5,540,848 * | 7/1996 | Engelhard ........................... 210/748 |
| 5,597,482 * | 1/1997 | Melyon .............................. 210/209 |
| 5,622,622 * | 4/1997 | Johnson ............................. 210/192 |
| 5,628,895 | 5/1997 | Zucholl . |
| 5,798,694 * | 8/1998 | Reber et al. . |
| 5,843,309 * | 12/1998 | Mancil ............................... 210/205 |
| 6,042,720 * | 3/2000 | Reber et al. ......................... 210/85 |

FOREIGN PATENT DOCUMENTS

| | | |
|---|---|---|
| 3-178396 | 8/1991 | (JP) . |
| 8-117742 * | 5/1996 | (JP) . |
| 8-117742 | 5/1998 | (JP) . |
| 97/06108 * | 2/1997 | (WO) . |

OTHER PUBLICATIONS

Ultrapure Data Sheets Nos. 1 to 3, Jan. 1993, Scores by Victoria, Australia.

WaterReview, Technical Briefs, "Treating the Water We Drink, When and Where We Drink It.", http://www.wqa.org/WQIS/Treating-the-Water.html (pp. 1–5).

(List continued on next page.)

*Primary Examiner*—W. L. Walker
*Assistant Examiner*—Marianne S. Ocampo
(74) *Attorney, Agent, or Firm*—James E. Gauger (57) ABSTRACT

An apparatus for storing and disinfecting a fluid includes a container (12) and a cap member (16) for containing the fluid and a cap member (16). The container (12) defines an opening (14) through which the fluid is dispensed therein and is removed therefrom and has at least two electrical contacts which mate with at least two electrical contacts in the cap member. The cap member (16) removably seals the opening of the container (12). An ultraviolet source (24) is mounted to at least one of the container (12) and the cap member (16). The ultraviolet source (24) emits ultraviolet radiation to disinfect the fluid contained in the container (12). A power source is electrically coupled to the at least two electrical contacts of the container (12).

6 Claims, 6 Drawing Sheets

OTHER PUBLICATIONS

WaterReview, Technical Briefs, "Improving the Quality of Water Through Disinfection.", http://www.wqa.org/WQIS/Improve–WQ–Disinfect.html (pp. 1–4).

James, Ron, "Ultra–Violet Light: Sterilizer, Clarifier or Both?", http://www.koiusa.com/ultravio.htm (pp. 1–2).

New Products, Outdoor Photographer, vol. 12, No. 7, Sep. 1996.

* cited by examiner

PORTABLE APPARATUS FOR STORING AND DISINFECTING A FLUID USING ULTRAVIOLET SOURCE

The present application is a continuation of "Apparatus for Storing and Disinfecting a Fluid", having Ser. No. 08/770,754, filed Dec. 19, 1996, now U.S. Pat. No. 6,042,720 issued Mar. 28, 2000 whose subject matter is hereby incorporated by reference into the disclosure of the present application.

RELATED APPLICATIONS

The present application is related to the following application which is assigned to the same assignee as the present application:

(1) "Food Storage Apparatus and Methods and Systems for Monitoring a Food Item", having Ser. No. 08/770,932, filed Dec. 19, 1996, now U.S. Pat. No. 5,798,694 (issued Mar. 28, 2000).

The subject matter of the above-identified related application is hereby incorporated by reference into the disclosure of this application.

FIELD OF THE INVENTION

The present invention relates to apparatus for disinfecting a fluid using ultraviolet radiation.

BACKGROUND OF THE INVENTION

The broad field of water treatment systems includes two classes of equipment. A first class, referred to as point-of-entry equipment, treats water before distribution through a community or a building. Point-of-entry equipment typically utilizes microfiltration, chlorination, and/or ozonation technologies to remove and/or kill various contaminants in water. A second class, referred to as point-of-use equipment, treats water at a single tap in a building or the like without regard to other taps in the building. Point-of-use equipment is typically utilized to remove health contaminants (e.g. lead) and aesthetic contaminants (e.g. sulfur) before dispensing water via the tap.

The above-described water treatment systems have become increasingly popular as more individuals become aware of contaminants present in the water supply. However, these systems are limited to utilization at a specific location (e.g. at an individual's place of residence), and hence are not amenable to portable use.

BRIEF DESCRIPTION OF THE DRAWINGS

The invention is pointed out with particularity in the appended claims. However, other features of the invention may become more apparent and the invention may be best understood by referring to the following detailed description in conjunction with the accompanying drawings in which:

DETAILED DESCRIPTION OF THE PREFERRED EMBODIMENT(S)

Embodiments of the present invention advantageously provide a portable apparatus having an ultraviolet source to kill biological contaminants in a fluid. The apparatus is amenable for storing, carrying, disinfecting, and dispensing of a fluid for consumption by an individual either at home or away from home. The embodiments thus provides a point-of-consumption fluid treatment apparatus, which can be utilized in conjunction with currently-available point-of-use and point-of-entry systems if desired, to treat a fluid before consumption by the individual. The portability of the apparatus is beneficial for use in disinfecting water obtained from sources away from home, such as from a public drinking fountain, a hotel, or a place of work.

Figure 1:
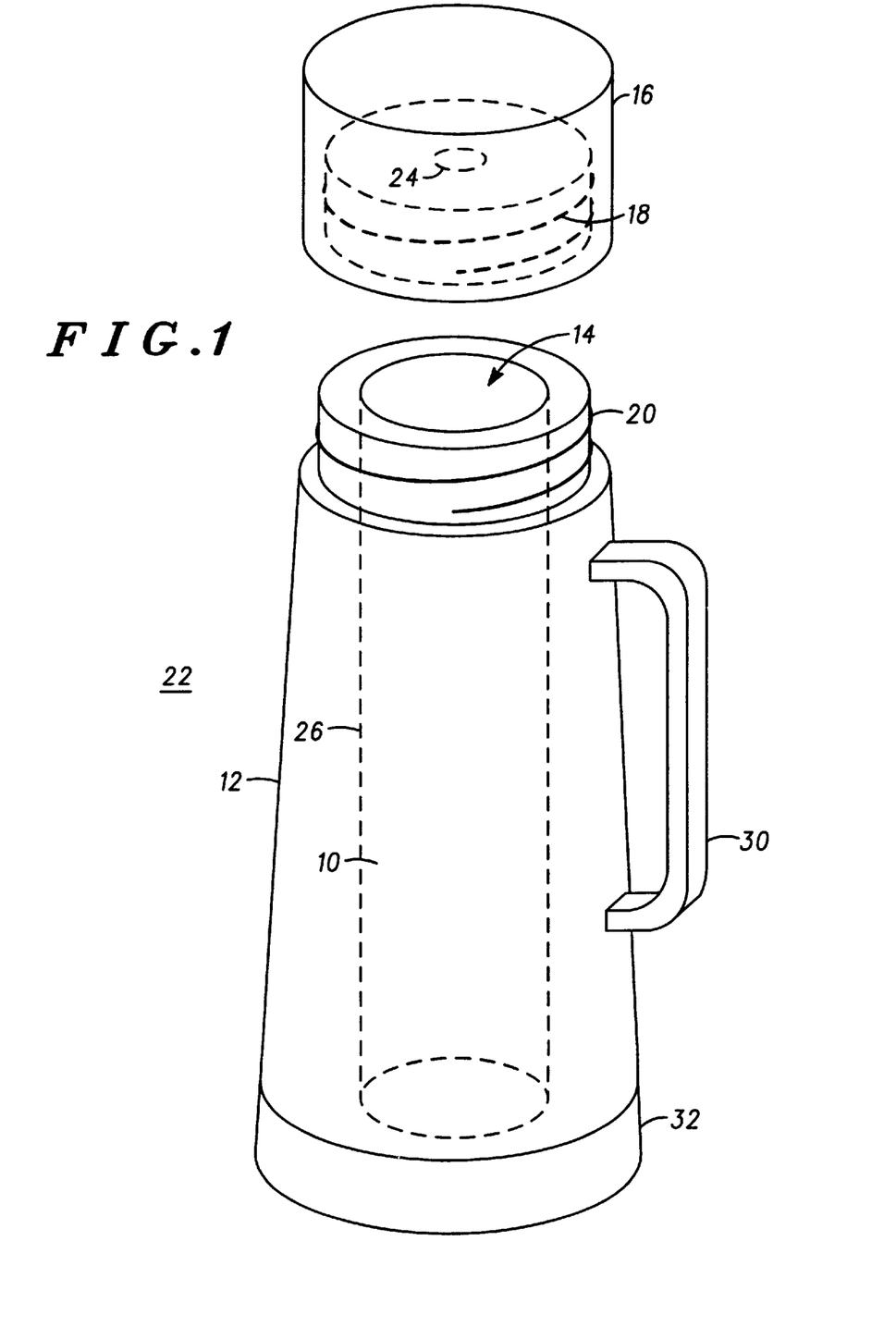
FIG. 1 is a perspective view of an embodiment of an apparatus for storing and disinfecting a fluid.

FIG. 1 illustrates an embodiment of an apparatus for storing and disinfecting a fluid 10. The apparatus comprises a container 12 for containing the fluid 10. The container 12 is sized in accordance with an amount of fluid which is to be stored and disinfected. Of particular interest are embodiments of the present invention wherein the container 12 has a capacity to store and disinfect up to one to two liters of fluid.

The container 12 defines an opening 14 through which the fluid 10 is dispensed into and removed from the container 12. A cap member 16 removably seals the opening 14 of the container 12. To secure the cap member 16 to the container 12, the cap member 16 can include a threading 18 which engages with a mating threading 20 of the container 12. The threading 18 and the mating threading 20 allow manual securing and removing of the cap member 16 to/from the container 12. It is noted that other means for securing the cap member 16 to the container 12 can be utilized in alternative embodiments of the present invention.

In a preferred embodiment, the container 12 at least partially thermally insulates the fluid 10 from an exterior environment 22 when the cap member 16 is secured. The container 12 can include a vacuum bottle or the like to provide the thermal insulation. As a result, a hot fluid can be maintained at a hot temperature and a cold fluid can be maintained at a cold temperature for a given time period when stored in the container 12.

The apparatus further comprises an ultraviolet source 24 mounted to at least one of the container 12 and the cap member 16. The ultraviolet source 24 emits ultraviolet radiation to disinfect the fluid 11 contained in the container 12. The ultraviolet light acts to destroy genetic material of various types of biological contaminants (e.g. bacteria and viruses) to inhibit their reproduction. Preferably, the ultraviolet source 24 produces germicidal ultraviolet light at a wavelength of about 254 nanometers. The ultraviolet source 24 can include a mercury vapor lamp for this purpose.

In the embodiment of FIG. 1, the ultraviolet source 24 is illustrated to be mounted to the cap member 16. It is noted, however, that the ultraviolet source 24 can be alternatively mounted to a portion of the container 12.

In preferred embodiments, the ultraviolet source 24 includes an ultraviolet lamp or an ultraviolet bulb which can be powered by batteries. For example, a four-watt ultraviolet lamp powerable by four AA batteries may be utilized. In an exemplary embodiment, the ultraviolet source 24 requires less than or equal to approximately 1 Watt of power to illuminate.

To enhance the disinfection process, the container 12 has an inner surface 26 which is ultraviolet-reflecting and ultraviolet-resistant. As a result, the inner surface 26 reflects the ultraviolet radiation emitted by the ultraviolet source 24, and hence, the disinfection of the fluid 10 is intensified.

Preferably, the container 12 and the cap member 16 are sized for carrying by an individual. As a result, an individual can carry a supply of disinfected fluid, such as water, for his/her personal consumption throughout a day. To assist the individual in carrying the apparatus, the container 12 optionally includes a handle 30 for gripping by the individual. A base member 32 is located at a bottom portion of the container 12 to allow the apparatus to rest on a flat surface, such as a table top or the like, during storage and disinfection.

It is noted that embodiments of the present invention are not limited to the form of the container 12 and the cap member 16 illustrated in FIG. 1, and that various sizes, shapes, and forms of containers and cap members can be utilized.

Figure 2:
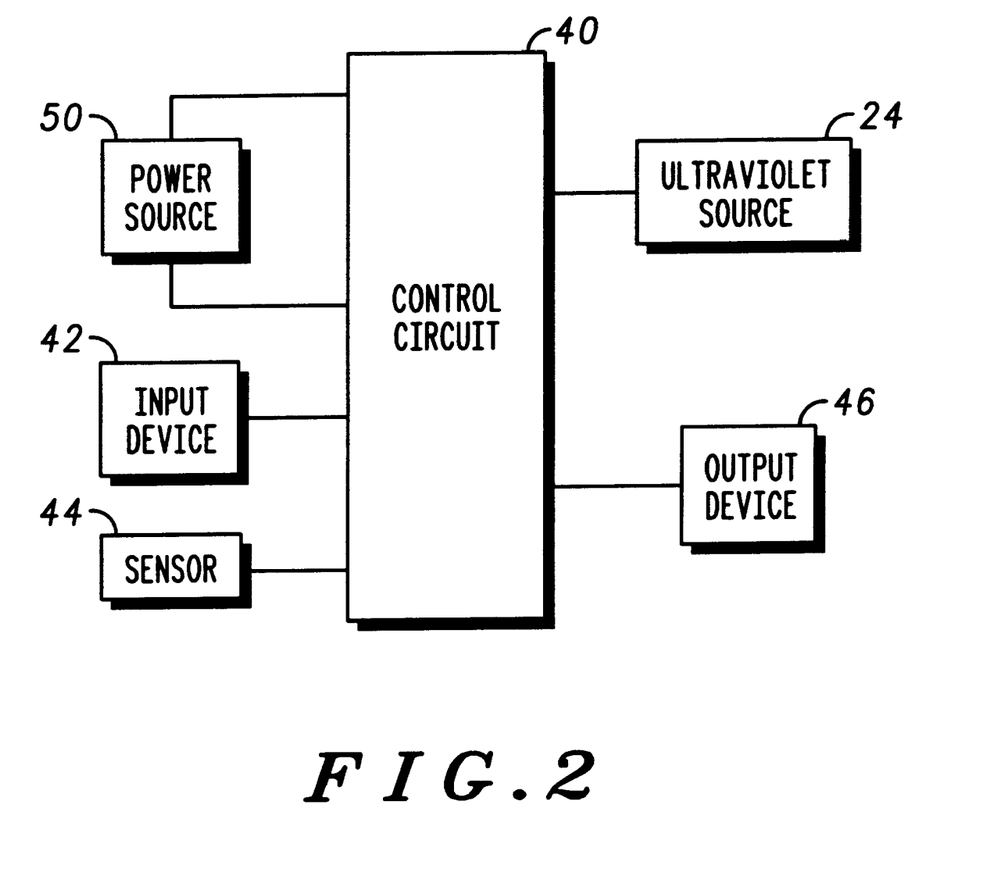
FIG. 2 is a block diagram of an embodiment of an apparatus for disinfecting the fluid stored in the apparatus of FIG. 1.

FIG. 2 is a block diagram of an embodiment of an apparatus for disinfecting the fluid 10 stored in the container 12. In general, each of the components illustrated in FIG. 2 can be integrated into either the container 12 or the cap member 16 of FIG. 1. As a result, numerous embodiments of the present invention can be formulated based on all possible two-set partitions of the components.

The apparatus includes a control circuit 40 in communication with the ultraviolet source 24. The control circuit 40 is operative to control a disinfect cycle by selectively illuminating and attenuating or extinguishing the ultraviolet source 24. It is noted that the term "illuminating" should be construed to include both continuous illumination and pulsed illumination of the ultraviolet source 24.

The control circuit 40 can have any of a variety of forms, including digital circuit embodiments and analog circuit embodiments. For example, the control circuit 40 can include one or more discrete transistors, integrated circuits, microprocessors, application-specific integrated circuits, programmable logic arrays, and/or other integrated circuits interconnected to provide the desired logic for controlling the disinfect cycle. Regardless of its form, the control circuit 40 is integrated within at least one of the cap member 16 and the container 12.

The apparatus further includes an input device 42 in communication with the control circuit 40. The input device 42 is accessible by a user to control the disinfect cycle. Using the input device 42, the user can initiate a disinfect cycle, terminate the disinfect cycle, or modify a parameter of the disinfect cycle.

The input device 42 can have any of a variety of forms, including but not limited to one or more switches, one or more buttons, a keypad, a knob, a dial, a touchpad, a touchscreen, or any combination thereof. Regardless of its form, the input device 42 is integrated with or mounted to either the cap member 16, the container 12, or both. A preferred location for integrating the input device 42 with the container 12 is in a portion of the handle 30.

Various approaches can be utilized to control and/or define a disinfect cycle. In one approach, the control circuit 40 is operative to illuminate the ultraviolet source 24 for a predetermined time duration of the disinfect cycle. The predetermined time duration can be fixed by the control circuit 40, or can be user-adjustable via the input device 42. Using this approach, a user would typically disinfect a fluid by: (i) dispensing the fluid into the container 12 through the opening 14; (ii) sealing the opening 14 with the cap member 16; (iii) optionally, setting the predetermined time duration using the input device 42; and (iv) initiating the disinfect cycle using the input device 42. The apparatus would then proceed to disinfect the fluid for the predetermined time duration. Once the disinfect cycle has completed, the fluid can be removed from the container 12, through the opening 14, for consumption by the user.

Another approach to controlling and/or defining a disinfect cycle utilizes a sensor 44 to sense a measure of quality of the fluid. Preferably, the sensor 44 is mounted to the inner surface 26 of the container 12, such as at the bottom of the container 12 near the base 32.

The sensor 44 communicates the measure of quality of the fluid to the control circuit 40. The control circuit 40 is operative to terminate the disinfect cycle when the measure of quality of the fluid satisfies a predetermined criterion, such as when the quality of the fluid attains a desired value. Here, a user would typically disinfect a fluid by: (i) dispensing the fluid into the container 12 through the opening 14; (ii) sealing the opening 14 with the cap member 16; (iii) optionally, setting a desired measure of water quality using the input device 42; and (iv) initiating the disinfect cycle using the input device 42. The apparatus would then proceed to disinfect the fluid until the quality of the fluid satisfies the predetermined criterion. Thereafter, the fluid can be removed from the container 12 for consumption by the user.

Regardless of the approach utilized to control the disinfect cycle, it is preferred that the apparatus include an output device 46 to provide an indication of the status of the disinfect cycle to the user. The output device 46 is integrated with or mounted to at least one of the cap member 16 and the container 12. The output device 46 can be utilized to provide an indication of an in-progress disinfect cycle, an indication of a time remaining in the disinfect cycle, an indication of the measure of quality of the fluid as sensed by the sensor 44, and/or an indication of a completed disinfect cycle.

Generally, the indication provided by the output device 46 can include an audible indication and/or a visual indication. To provide an audible indication, the output device 46 can comprise an audio output device such as a speaker, a piezoelectric buzzer, or a like transducer in communication with the control circuit 40. To provide a visual indication, the output device 46 can comprise a light-emitting diode (LED) display, a liquid crystal display (LCD), or a like display element in communication with the control circuit 40.

Preferably, the output device 46 provides a visual indication of an in-progress disinfect cycle. Here, an LED or an LCD element is activated to indicate to the user that the fluid is being disinfected. It is further preferred that the output device 46 provide a visual indication of either the time remaining in the disinfect cycle or of the sensed quality of the fluid. The time remaining or the sensed quality can be indicated numerically using LED or LCD displays, or can be indicated graphically using a bar graph type of display, for example. Once the disinfect cycle has completed, a visual indication and/or an audible indication alerts the user that the fluid is suitable for consumption.

An additional feature which can be provided by the control circuit 40 is to inhibit illumination of the ultraviolet source 24 when the cap member 16 is removed from the opening 14 of the container 12. Various techniques for sensing when the cap member 16 is removed from the container 12 can be utilized for this purpose. One approach is provided in a subsequent description herein.

A power source 50 is integrated into either the cap member 16 or the container 12 to provide a source of power for at least one of the control circuit 40, the input device 42, the sensor 44, the output device 46, and the ultraviolet source 24. Various embodiments of the power source 50 are illustrated in FIGS. 3 to 6.

Figure 3:
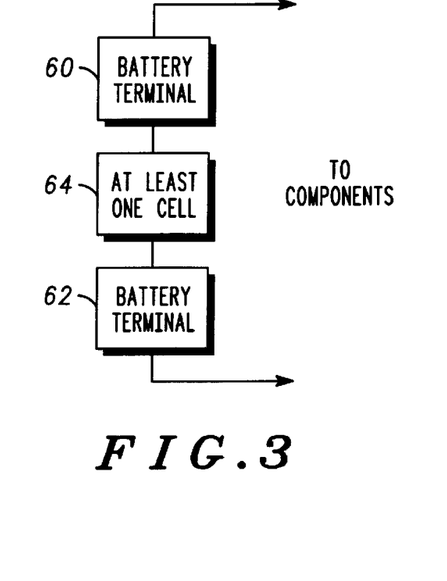
FIG. 3 is a block diagram of a battery-based embodiment of the power source of FIG. 2.

FIG. 3 is a block diagram of a battery-based embodiment of the power source 50. In this embodiment, the power source 50 includes at least two battery terminals 60 and 62 to couple at least one cell 64 to the components in the apparatus. Here, either the cap member 16 or the container 12 includes a battery-receiving compartment to house the at least one cell 64. The size and shape of the battery-receiving compartment is selected based upon the type and the number of cells utilized to power the apparatus. Examples of cells which can be utilized to power the apparatus include, but are not limited to, standard AAA, AA, C, D, and 9 Volt batteries.

Figure 4:
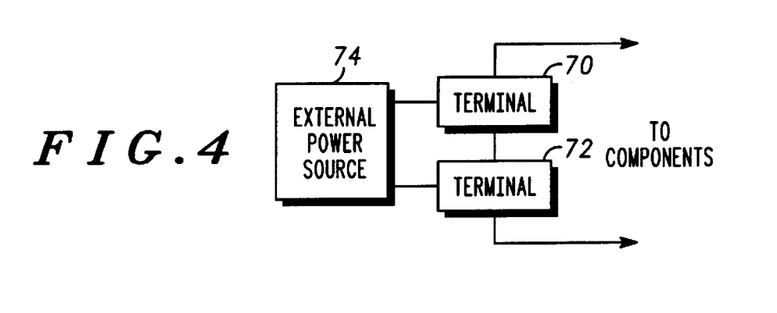
FIG. 4 is a block diagram of another embodiment of the power source of FIG. 2.

FIG. 4 is a block diagram of another embodiment of the power source 50. In this embodiment, the power source 50 includes at least two terminals 70 and 72 for coupling the components to an external power source 74. Here, for example, the power source 50 can include an externally-accessible jack for receiving a plug from an AC adapter.

Figure 5:
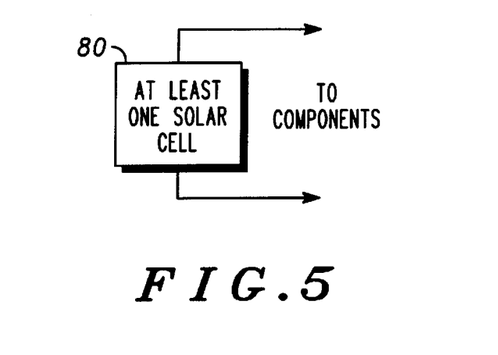
FIG. 5 is a block diagram of a solar embodiment of the power source of FIG. 2.

FIG. 5 is a block diagram of a solar embodiment of the power source 50. Here, the power source 50 includes at least one solar cell 80 mounted to an exterior surface of either the cap member 16, the container 12, or both. The at least one solar cell 80 converts light energy to electrical current to power the components in the apparatus.

Figure 6:
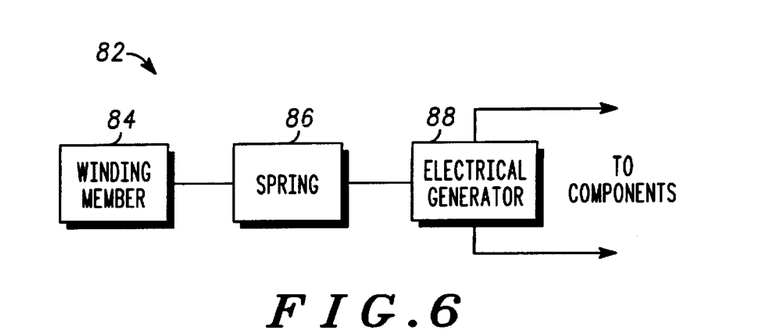
FIG. 6 is a block diagram of a wind-up embodiment of the power source of FIG. 2.

FIG. 6 is a block diagram of a wind-up embodiment of the power source 50. In this embodiment, the power source 50 includes a wind-up power source mechanism 82, such as an adaptation of the wind-up mechanism utilized in the Freeplay Wind-Up Radio produced by Baygen. The wind-up power source mechanism 82 has an externally-accessible winding member 84, a spring 86 mechanically coupled to the winding member 84, and an electrical generator 88 having a shaft mechanically coupled to the spring 86. The spring 86 stores energy produced when the user winds the winding member 84. The spring 86 releases the energy stored therein in the form of rotational energy, which is coupled to the shaft of the electrical generator 88. The electrical generator 88 converts the rotational energy to electrical energy which can be regulated and/or stored to power the components in the apparatus.

It is noted that the power source 50 can include any combination of the above-described power sources in FIGS. 3 to 6 to provide multiple powering means for the apparatus. An external illustration of an embodiment of the apparatus having embodiments of all of the above-described power sources is given in FIG. 7.

Figure 7:
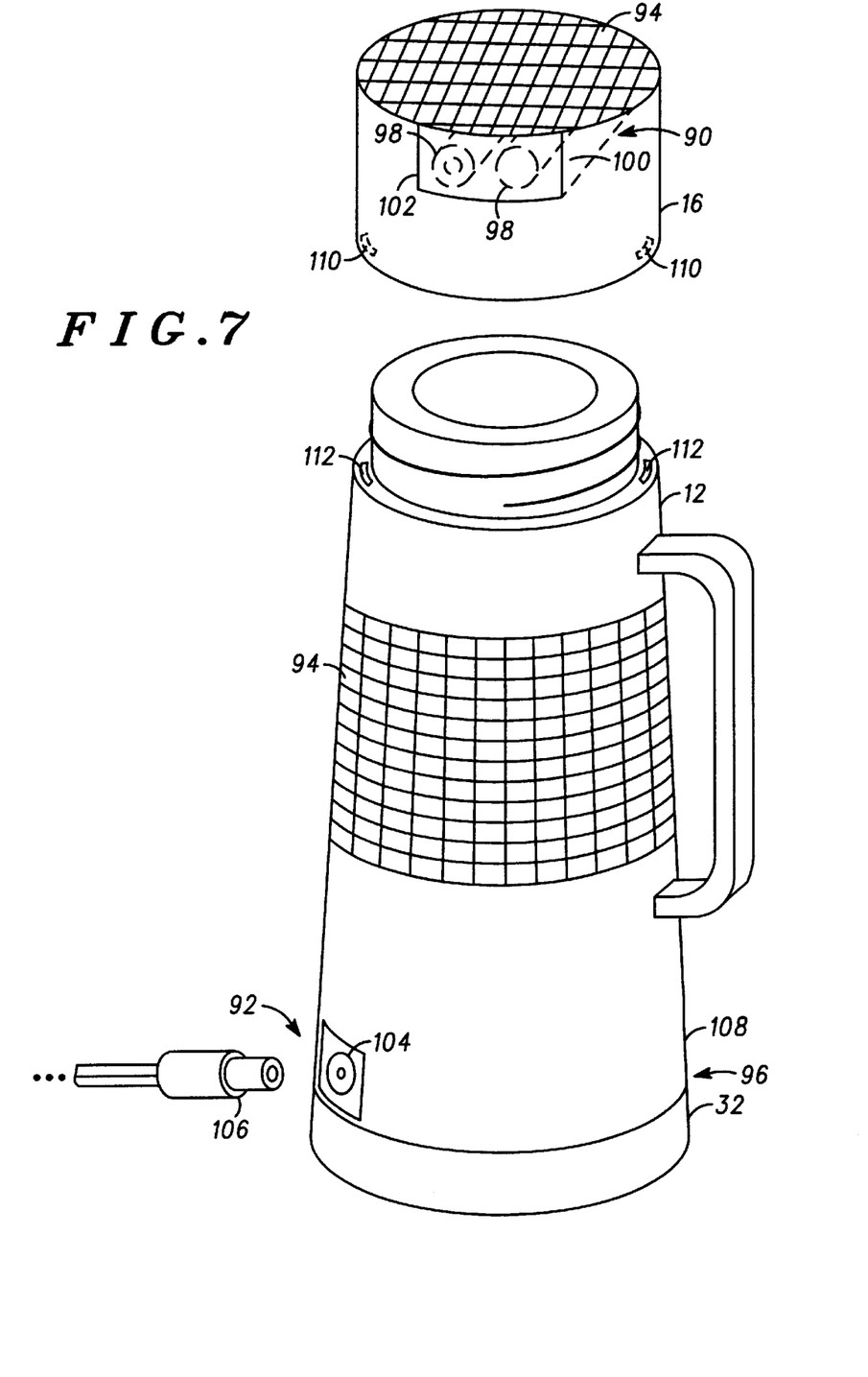
FIG. 7 is a perspective view of an embodiment of an apparatus for storing and disinfecting a fluid having a battery source, an external source, a solar source, and a wind-up source of power.

FIG. 7 illustrates an embodiment of an apparatus for storing and disinfecting a fluid having a battery source 90, an external source 92, a solar source 94, and a wind-up source 96 of power. The battery source 90 includes a pair of batteries 98 housed in a battery-receiving compartment 100. A panel 102 secures the batteries 98 within the battery-receiving compartment 100. When within the battery-receiving compartment 100, the batteries 98 contact battery terminals (not specifically illustrated) to provide power to the apparatus.

The external source 92 includes an externally-accessible jack 104 mounted to either the cap member 16 or the container 12. The externally-accessible jack 104 receives a plug 106 from an AC adapter to provide power to the apparatus.

The solar source 94 includes a solar panel mounted to an external surface of either the cap member 16 or the container 12.

The wind-up source 96 is preferably located near the base 32 of the container 12. In one embodiment, the wind-up source 96 is wound by rotating a portion of the base 32 with respect to a main body 108 of the container 12.

To interconnect components and/or power sources between the cap member 16 and the container 12, the cap member 16 includes at least two electrical contacts 110 which contact at least two mating contacts 112 of the container 12 when the cap member 16 is secured to the container 12. The at least two electrical contacts 110 are coupled to any of the components and/or power sources integrated with the cap member 16, while the at least two mating contacts 112 are coupled to any of the components and/or power sources integrated with the container 12. It is noted that other means, e.g. a wireless receiver and wireless transmitter, can be utilized so that components and/or power sources integrated with the cap member 16 can communicate with components and/or power sources integrated with the container 12.

Figure 8:
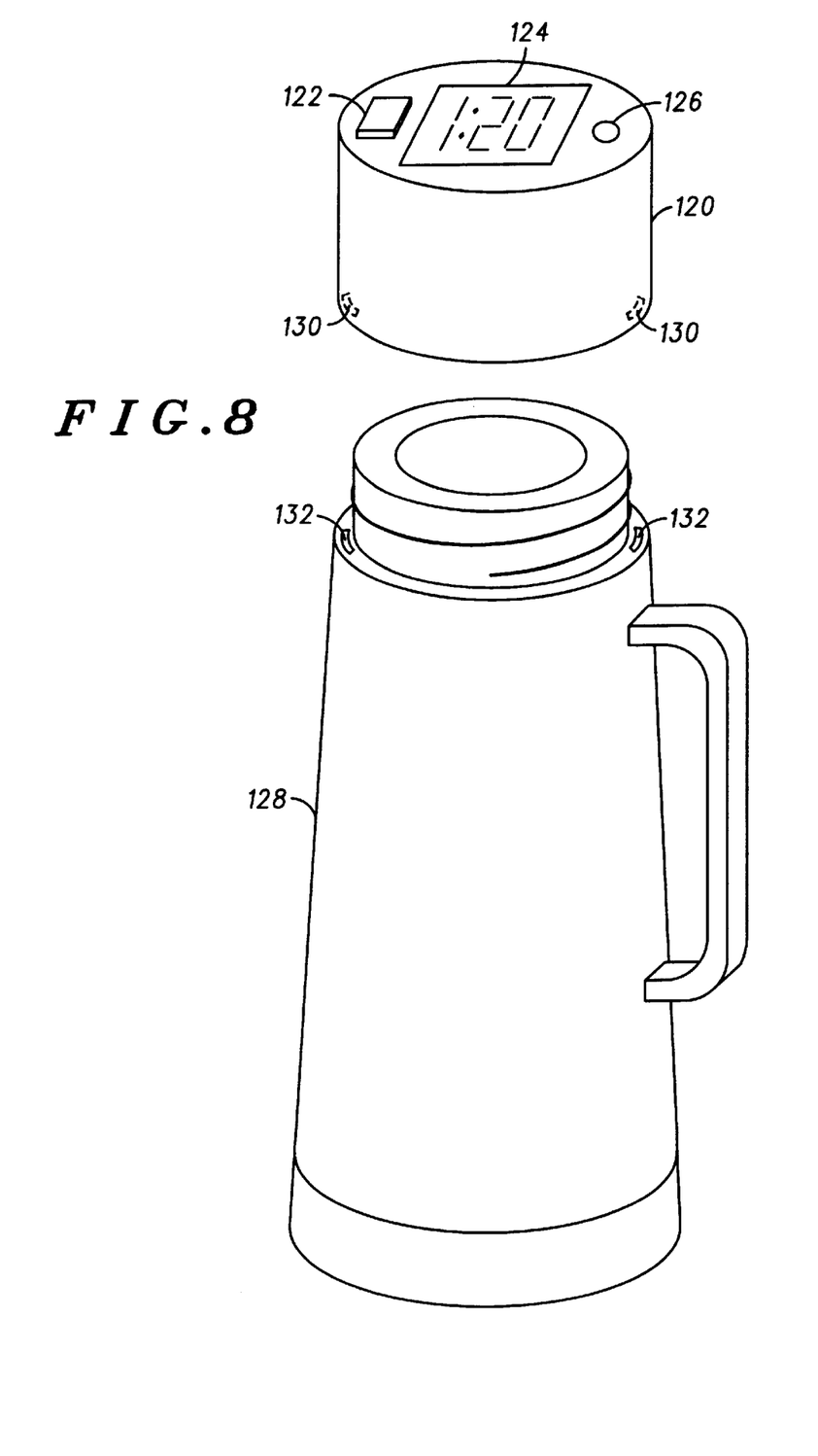
FIG. 8 is an external view of a preferred embodiment of an apparatus for storing and disinfecting a liquid.

FIG. 8 is an external view of a preferred embodiment of an apparatus for storing and disinfecting a liquid. In this embodiment, a cap member 120 houses a control circuit (not specifically illustrated), an ultraviolet source (not specifically illustrated) responsive to the control circuit, and a battery-receiving compartment to house a battery for powering the apparatus. Integrated with an exterior surface of the cap member 120 are: a button 122 coupled to the control circuit to initiate and inhibit illumination of the ultraviolet source; a numeric display device 124 to display either an amount of time remaining in a disinfect cycle or a measure of quality of the fluid; and an audio output device 126 which produces an audible indication when the disinfect cycle has completed.

A water quality sensor (not specifically illustrated) is located within a container 128 Lo sense the quality of the fluid therein. A signal indicative of the quality is communicated to the control circuit in the cap member 120 via electrical contacts 130 and mating contacts 132. The control circuit senses that the cap member 120 has been removed from the container 128 when an open circuit is sensed between the electrical contacts 130. At this time, the control circuit inhibits illumination of the ultraviolet source.

Figure 9:
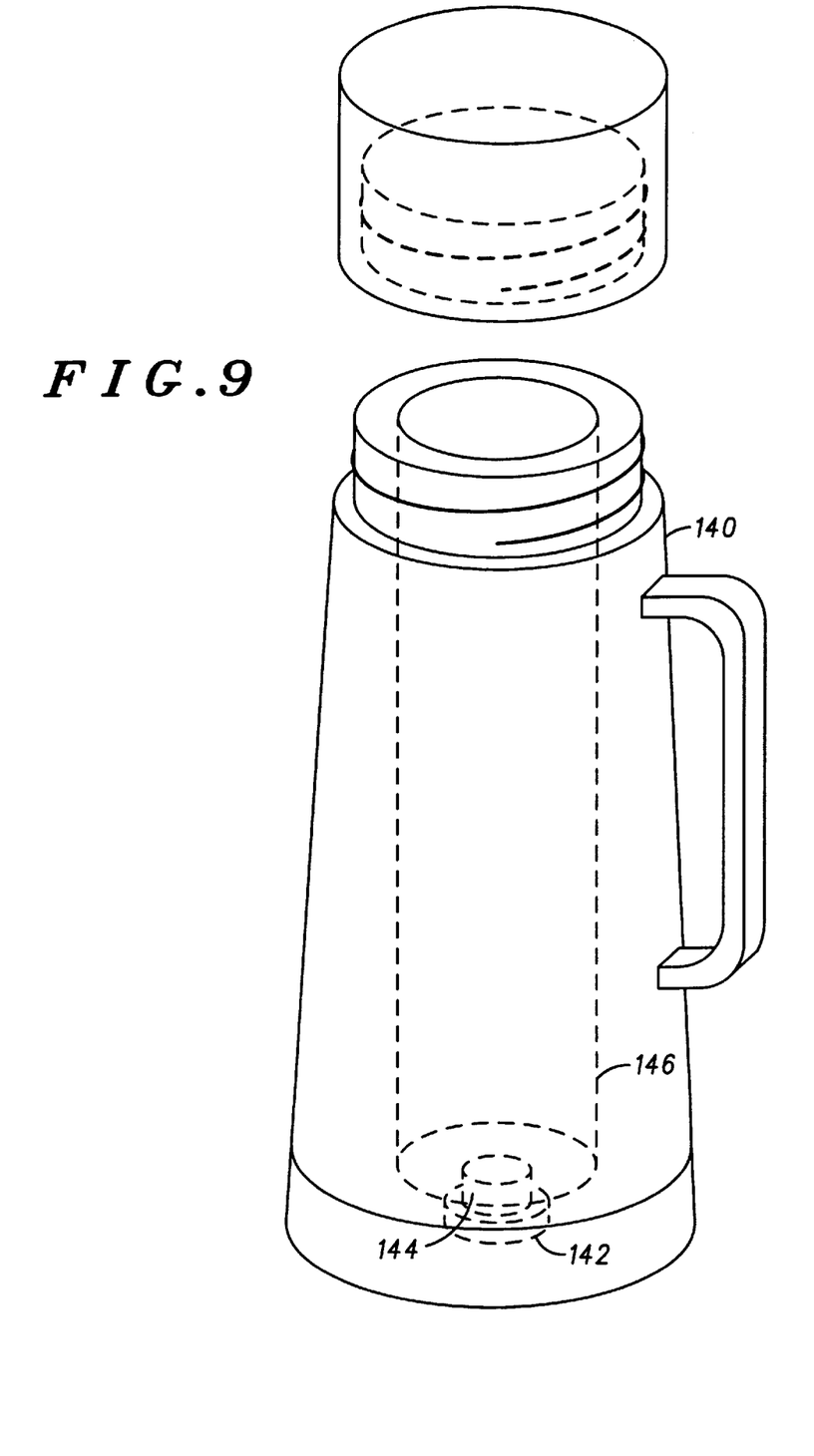
FIG. 9 is a modified perspective view that illustrates an approach to sensing ultraviolet light generated within a container.

FIG. 9 is an illustration of an approach to sensing the ultraviolet light generated within a container 140. A plug 142 is disposed within a plug-receiving cavity defined by the container 140. The plug 142 houses an ultraviolet-sensitive material 144 that senses an amount of ultraviolet light generated within the container 140. Preferably, the plug 142 is located near a portion of container 140 where an inner surface 146 is transparent to ultraviolet light. In one embodiment, the ultraviolet-sensitive material 144 changes color or intensity when subjected to ultraviolet light. Here, the status of the disinfection process can be determined by removing the plug 142 and viewing the color or intensity of the ultraviolet-sensitive material 144. Alternatively, the ultraviolet-sensitive material 144 can produce an electrical signal representative of a measure of the ultraviolet light generated within the container 140. Here, for example, the plug 142 can include an ultraviolet-sensitive photo cell and a readout device coupled thereto to provide a reading of the ultraviolet light generated within the container 140.

Thus, there has been described herein several embodiments including preferred embodiments of a portable fluid disinfection apparatus.

Because the various embodiments of the present invention provide a portable apparatus for disinfecting a fluid, they provide a significant benefit in allowing an individual to store, carry, disinfect, and dispense a fluid for his/her consumption.

Additionally, the various embodiments of the present invention as herein-described can include a wind-up source and/or a solar source for powering the apparatus without requiring batteries or external AC power. This further promotes the portability of the apparatus for use in hiking and camping applications.

It will be apparent to those skilled in the art that the disclosed invention may be modified in numerous ways and may assume many embodiments other than the preferred forms specifically set out and described above.

Accordingly, it is intended by the appended claims to cover all modifications of the invention which fall within the true spirit and scope of the invention.

What is claimed is:

1. An apparatus for storing and disinfecting a fluid, the apparatus comprising:
    a container for containing the fluid, the container having an opening and at least two electrical contacts;
    a cap member having at least two electrical contacts which respectively mate with the at least two electrical contacts of the container when the cap member seals the opening of the container; and
    an ultraviolet source mounted to the cap member and in electrical communication with the at least two electrical contacts of the cap member.

2. The apparatus of claim 1 further comprising a power source integrated with the container, the power source electrically coupled to the at least two electrical contacts of the container.

3. The apparatus of claim 1 further comprising at least one solar cell mounted to the container and electrically coupled to the at least two electrical contacts of the container.

4. The apparatus of claim 1 further comprising a jack mounted to the container and electrically coupled to the at least two electrical contacts of the container.

5. The apparatus of claim 1 wherein the jack is to receive a plug from an AC adapter.

6. The apparatus of claim 1 further comprising:
    a battery-receiving compartment defined by the container; and
    at least two battery terminals electrically coupled to the at least two electrical contacts of the container.

* * * * *